United States Patent
Sarkar et al.

(10) Patent No.: US 7,163,482 B2
(45) Date of Patent: Jan. 16, 2007

(54) CONTROLLED RELEASE OF PERFLUOROPOLYETHER ANTIFOAM ADDITIVES FROM COMPOUNDED RUBBER

(75) Inventors: Reuben Sarkar, Novi, MI (US); Brent D. Calcut, Allen Park, MI (US); Thomas J. Chapaton, Sterling Heights, MI (US); Marie-Christine G. Jones, Bingham Farms, MI (US)

(73) Assignee: General Motors Corporation, Detroit, MI (US)

( * ) Notice: Subject to any disclaimer, the term of this patent is extended or adjusted under 35 U.S.C. 154(b) by 323 days.

(21) Appl. No.: 10/930,325

(22) Filed: Aug. 31, 2004

(65) Prior Publication Data

US 2005/0027052 A1    Feb. 3, 2005

Related U.S. Application Data

(62) Division of application No. 10/365,358, filed on Feb. 12, 2003, now Pat. No. 7,087,674.

(51) Int. Cl.
*F16H 3/00*    (2006.01)

(52) U.S. Cl. ..................... 475/159; 475/269; 508/582; 508/416

(58) Field of Classification Search ................ 475/159, 475/269; 508/582, 416
See application file for complete search history.

(56) References Cited

U.S. PATENT DOCUMENTS 5,385,686 A * 1/1995 Miller et al. ................. 508/215

* cited by examiner

*Primary Examiner*—Ling-Sui Choi
*Assistant Examiner*—Satya Sastri
(74) *Attorney, Agent, or Firm*—Dan L. Thompson

(57) ABSTRACT

Antifoam compositions for functional fluids contain antifoam agents comprising perfluoropolyether compounds (PFPE). An automatic transmission fluid is provided containing the antifoam composition in a lubricating base oil, along with conventional additives such as antiwear agents. Automobile transmissions are provided that contain an automatic transmission fluid containing the new antifoam compositions. In a further embodiment, methods are provided for reducing foam in an engine oil or unwanted noise in an automobile transmission during operation, comprising lubricating the engine or transmission with a lubricating fluid containing the antifoam compositions of the invention.

24 Claims, No Drawings

CONTROLLED RELEASE OF PERFLUOROPOLYETHER ANTIFOAM ADDITIVES FROM COMPOUNDED RUBBER

This application is a division of U.S. Ser. No. 10/365,358, filed on Feb. 12, 2003 now U.S. Pat. No. 7,087,674.

FIELD OF THE INVENTION

The present invention relates to rubber compositions containing perfluoropolyether polymers. More specifically, the invention relates to antifoam compounds for functional fluids, methods for formulating the fluids, and uses of the fluids in engines and transmissions.

BACKGROUND OF THE INVENTION

Automatic transmission fluids (ATF) are non-compressible lubricant compositions containing a number of conventional additives. As typically used, an ATF serves as a hydraulic fluid, activating and engaging gears in the transmission by a series of valves and other hydraulic circuits, and as a lubricant for the hydraulic pump used to provide hydraulic pressure for operation of the transmission. Engine oils are lubricating fluids containing conventional antiwear, antioxidant, and other additives in a mineral oil or synthetic oil base.

ATF, engine oils, and other functional fluids generally contain detergent and similar additives that tend to produce foam if air is entrained into the fluid. Additionally, impurities are produced in the fluid over time (for example by oxidation or degradation of the base oil), some of which may contribute to a foaming tendency in the functional fluid. Excess foam in a functional fluid can adversely affect its Theological, hydraulic, lubricating, and cooling performance. Entrained air in a hydraulic system fluid such as an ATF is a problem for the further reason that the air alternately expands in the low pressure inlet side of pump, and quickly contracts or is compressed as the fluid passes through the pump to the high pressure outlet side.

The resulting implosion of air bubbles on the outlet side causes pressure ripples in the hydraulic pump. The pressure ripples can damage the hydraulic system and can cause objectionable noise, manifested as "pump whine" in some transmissions. New automatic transmissions, such as continuously variable transmissions (CVT), with their compact sumps and high pump pressures, have raised the possibility of consumer reaction to the noise. In response, a number of OEM's have taken steps to reduce the air level in the fluid of their new transmissions by isolating or baffling the internal rotating components to separate them from the fluid, or by introducing aeration additives into the ATF to help the oil release the entrained air more quickly or otherwise reduce the level of entrained air. Additionally, conventional antifoam agents have been employed to help dissipate surface air bubbles.

The insolubility of the antifoam agents leads to some difficulties that must be addressed by the formulator of functional fluids such as ATF and engine oils. Typically, the antifoam agent is denser than the base fluids and tends to fall out during shipping and storage before being added to the transmission. In practice, this limits the amount of antifoam agent that can be incorporated or dispersed into the fluid by the supplier. Alternatively, a formulated fluid may be re-dispersed prior to use, but the extra step creates additional expense in the manufacturing process.

New methods for preparing functional fluids containing insoluble antifoam compounds are needed. It would be desirable to provide such methods for delivery of antifoam compounds into functional fluids such as transmission fluids and engine oils in order to provide advantages over prior art methods.

SUMMARY OF THE INVENTION

Methods of delivering an antifoam compound or compounds into a functional fluid are provided through the use of a rubber composition. The rubber composition comprises an elastomer and a perfluoropolyether antifoam compound that leaches out of the rubber composition when placed in contact with the functional fluid. The rubber composition is placed in contact with the functional fluid (for example, an automatic transmission fluid or an engine lubricating oil), whereupon the antifoam compound leaches into the functional fluid. The elastomer may be selected from the group consisting of natural rubber and synthetic rubber, and advantageously comprises a high temperature elastomer.

In another embodiment, an engine or automatic transmission is provided along with methods for incorporating a rubber composition into the lubricant sump of the engine or transmission. The rubber composition contains an elastomer and antifoam compound as discussed above.

Methods for treating an engine or an automatic transmission with antifoam and for reducing pump whine in an automatic transmission involve contacting the functional fluid in the transmission or engine with a rubber composition that contains a perfluoropolyether compound that leaches out upon contact with the fluid. Preferably, an amount of antifoam compound leaches from the rubber composition to deliver from 0.0005% (5 ppm) to 1% by weight of the antifoam compound to the functional fluid.

DETAILED DESCRIPTION OF PREFERRED EMBODIMENTS

The term functional fluid refers to a liquid composition, typically for use in industry, into which it is desirable or necessary to add an antifoam compound. As conventionally used, the term characterizes the fluid by the function it carries out. Non-limiting examples of functional fluids include transmission fluids, hydraulic fluids, lubricating fluids, engine oils, heat transfer fluids, brake fluids, cooling fluids, and the like.

In one embodiment, the method of the invention provides a rubber composition containing an antifoam compound that leaches out of the rubber composition when placed in contact with a functional fluid. Methods for delivering an antifoam compound into a functional fluid are also provided, comprising contacting the functional fluids with the rubber composition. In addition to the antifoam compound, the rubber composition also contains an elastomer which may be selected from a wide variety of natural or synthetic rubbers. In a preferred embodiment, the elastomer comprises a high temperature elastomer such as acrylic elastomers and ethylene acrylic elastomers.

In another embodiment, methods for delivering an antifoam compound into an engine or an automatic transmission in the sump of the engine or automatic transmission are provided. The methods include installing a rubber composition into the sump of the transmission or engine and adding a fluid to the sump to contact the rubber composition. Upon contact with the fluid in the sump, the antifoam compound in the rubber composition leaches from the composition into the fluid.

In a preferred embodiment, an automatic transmission is provided containing a housing defining a lubricant sump. A rubber composition such as described above is installed into the lubricant sump, and antifoam compound leaches out of the rubber composition when contacted with the automatic transmission fluid. Methods for reducing unwanted noise or pump whine in an automatic transmission comprise the step of treating the automatic transmission fluid with an antifoam compound by placing the automatic transmission fluid in contact with a rubber composition as described above. While in contact with the fluid, antifoam compound leaches from the rubber composition into the transmission fluid. The resulting reduction in foam leads to a lessening of unwanted cavitation or pump whine noise. Reduction of cavitation may lead to increased component life.

The rubber composition may be provided in the form of a seal used in an automatic transmission. Seals include, without limitation, gaskets, O-rings, and other sealing members. In another embodiment, the rubber composition is used in contact with the transmission fluid, but does not act as a seal in the automatic transmission. In this embodiment, the rubber composition may be placed anywhere in the transmission system in contact with the transmission fluid.

In another embodiment, an engine, preferably an automobile engine, is provided containing a rubber composition as described above installed in the sump. Methods for reducing foam in the engine comprise placing a lubricating oil in contact with the rubber composition in the sump, whereupon antifoam compound leaches into the engine oil.

The compositions, engine, transmission, and methods of the invention are based on the use of a new antifoam composition for functional fluids. The antifoam compositions of the invention contain perfluoropolyether compounds (PFPE). The PFPE of the invention function to reduce foam in the functional fluid during operation. In one embodiment, the reduction in foam leads to a diminution of noise caused by entrained air in the hydraulic system.

Perfluoropolyether compounds are polymers containing a plurality of ether groups in the background chain of the polymer, and wherein some or all of the carbon hydrogen bonds of a standard polyether are replaced by carbon fluorine bonds. In one embodiment, the perfluoropolyether compound comprises a plurality of —$(C_aF_{2a}O)$— repeating units, wherein a is from 1 to 10. Non-limiting examples of such repeating units include the following:

—$(CF_2—CF(CF_3)—O)$—
—$(CF_2—CF_2—CF_2—O)$—
—$(CF_2—CF_2—O)$—

In another embodiment, the PFPE compounds contain repeating units of —$(C_bF_{2b}O)$— and —$(CF_2O)$— wherein b is from 2 to 10.

Perfluoropolyether compounds of the invention can be synthesized by methods well known in the art. In a non-limiting example, they may be synthesized by polymerizing perfluoroolefins in the presence of an oxidizing agent. Non-limiting examples of perfluoroolefins include tetrafluoroethylene and hexafluoropropylene.

The perfluoropolyether compounds comprise a backbone having repeating perfluoroether units as described above, and in addition are further characterized by two end groups at either end of the perfluoropolyether chain. As described further below, the end groups of the perfluoropolyether compound may be non-functional, in the case of a halogen atom, a perfluoroalkoxy group, and a perfluoroalkyl group, or may contain a number of different functional groups. Non-limiting examples of functional groups include alkyl amide, silane, phosphate, phosphate esters, carboxyl, organic ester, and hydroxyl. Thus, representative structures of perfluoropolyether compounds are given as:

$$R^1—(—CFCF_3—CF_2—O—)_n—R^2 \quad (I)$$

$$R^1—(—CF_2—CF_2—CF_2—O—)_n—R^2 \quad (II)$$

$$R^1—(—CF^2—CF^2\ O—)_n—(—CF_2—O—)_m—R^2 \quad (III)$$

$$R^1—(—CF_2—CFCF_3—O—)_n—(—CF_2—O—)_m—R^2 \quad (IV)$$

where $R^1$ and $R^2$ comprise the functional or non-functional end groups noted above. As is conventional, the subscripts n and m refer to the number of respective repeating units in the backbone of the PFPE. The values of the m and n determine the molecular weight of the PFPE.

Generally, PFPE of the invention should be relatively insoluble in the lubricating base oil of the functional fluid, and have a viscosity in the range of approximately 1 to 150,000 centistokes. The PFPE generally have a density greater than the lubricating oil, and as such tend to settle out of the fluid during rest and sit at the bottom of the sump. It is believed that if the viscosity of the PFPE is greater than about 150,000 centistokes, the PFPE will be difficult to re-disperse into the functional, such as a transmission, fluid upon operation, especially on cold winter days. Accordingly, PFPE of the invention are selected with values of n and m such that the viscosity is in the preferred range. As a practical matter, n should be at least about 3. In one preferred commercial embodiment, the sum of m+n is from about 8 to about 45. In another embodiment, the sum of m+n is from about 40 to about 180. PFPE of formula I are commercially available where n=44–45, where n=19, and with n=13–14. Commercial embodiments of formula IV are available with m+n from 40–180 and the ratio m/n in the range of 0.5–2.0. In another commercial embodiment, the sum of m+n is from 8–45 and the ratio m/n is from 20–1,000. PFPE of the invention are commercially available, for example under the Fomblin® line of Ausimont or the Krytox® line of DuPont. Non-limiting commercial examples of PFPE suitable for use in the transmission fluid or engine oil of the invention are given in Table 1.

TABLE 1

| Supplier | Tradename | Structure |
|---|---|---|
| Solvey/Ausimont | Fomblin W500 | Mixture of: $F_3CO(CFCF_2O)_m(CF_2O)_nCF_3$ |
| | | $\quad\quad\quad\quad\quad\quad\quad\quad\;\; |$ |
| | | $\quad\quad\quad\quad\quad\quad\quad\quad CF_3$ |
| | | m + n = 8–45; m/n = 20–1,000 |
| | | and $F_3CO(CF_2CF_2O)_m(CF_2O)_nCF_3$ |
| | | m + n = 40–180; m/n = 0.5–2.0 |

TABLE 1-continued

| Supplier | Tradename | Structure |
|---|---|---|
| Solvey/Ausimont | Fomblin M60 | $F_3CO(CF_2CF_2O)_m(CF_2O)_nCF_3$<br>m + n = 40–180; m/n = 0.5–2.0 |
| Dupont | Krytox GPL 107 | $F(CFCF_2O)_nCF_2CF_3$<br>      \|<br>      $CF_3$<br>n = 44–45 |
| Dupont | Krytox GPL 104 | $F(CFCF_2O)_nCF_2CF_3$<br>      \|<br>      $CF_3$<br>n = 19 |
| Dupont | Krytox GPL 103 | $F(CFCF_2O)_nCF_2CF_3$<br>      \|<br>      $CF_3$<br>n = 13–14 |
| Dupont | Krytox GPL 105 | $F(CFCF_2O)_nCF_2CF_3$<br>      \|<br>      $CF_3$<br>n = 28 |
| Solvey/Ausimont | Fomblin Y06 | $F_3CO(CFCF_2O)_m(CF_2O)_nCF_3$<br>         \|<br>         $CF_3$<br>m + n = 8–45; m/n = 20–1,000 MW = 1,800 |
| Solvey/Ausimont | Fomblin M30 | $F_3CO(CF_2CF_2O)_m(CF_2O)_nCF_3$<br>m + n = 40–180; m/n = 0.5–2.0 |
| Solvey/Ausimont | Fomblin Y25 | $F_3CO(CFCF_2O)_m(CF_2O)_nCF_3$<br>         \|<br>         $CF_3$<br>m + n = 8–45; m/n = 20–1,000 MW = 3,200 |
| Solvey/Ausimont | Fomblin M15 | $F_3CO(CF_2CF_2O)_m(CF_2O)_nCF_3$<br>m + n = 40–180; m/n = 0.5–2.0 |

In the examples given above, the end groups $R^1$ and $R^2$ are respectively selected from the group consisting of fluorine atom, a perfluoroalkoxy group, and a perfluoroalkyl group. In a preferred embodiment, the perfluoroalkyl group is a trifluoromethane group, —$CF_3$. Other perfluoroalkyl groups include —$C_nF_{2n+1}$, wherein n is from 2 to 10. In another preferred embodiment, the perfluoroalkoxy group is a trifluoromethoxy group, —$OCF_3$. Other perfluoroalkoxy groups include —$OC_nF_{2n+1}$, wherein n is from 2 to 10.

The PFPE of the invention generally exhibit low pour points that allow them to be used advantageously at low temperatures. The pour point is preferably −20° C. or lower, more preferably −40° C. or lower, and even more preferably below −40° C. In addition, the PFPE exhibit favorable volatility, expressed as evaporation weight loss according to ASTM 2595. Preferably, the percentage weight loss at a given temperature will be 20% or less, more preferably 10% or less, and even more preferably 1% or less, measured at temperatures of 120° C.–204° C. These and other physical properties of some commercially available PFPE of the Fomblin line are given in Tables 2, 3, and 4.

TABLE 2

| Typical Properties | Fomblin Y Lubricant Grades | | | | | | |
|---|---|---|---|---|---|---|---|
| | Y04 | Y06 | Y25 | Y45 | YR | YR1500 | YR1800 |
| Approximate ISO grade | 15 | 22 | 100 | 150 | 320 | 460 | 460 |
| Molecular weight (AMU) | 1,500 | 1,800 | 3,200 | 4,100 | 6,250 | 6,600 | 7,250 |
| Kinematic viscosity (ASTM D445) | | | | | | | |
| 20° C. (cSt) | 38 | 60 | 250 | 470 | 1200 | 1500 | 1850 |
| 40° C. (cSt) | 15 | 22 | 80 | 147 | 345 | 420 | 510 |

TABLE 2-continued

| | Fomblin Y Lubricant Grades | | | | | | |
|---|---|---|---|---|---|---|---|
| Typical Properties | Y04 | Y06 | Y25 | Y45 | YR | YR1500 | YR1800 |
| 100° C. (cSt) | 3.2 | 3.9 | 10 | 16 | 33 | 40 | 47 |
| Viscosity index (ASTM D2270) | 60 | 70 | 108 | 117 | 135 | 135 | 135 |
| Pour point (° C.) (ASTM D97) | −58 | −50 | −35 | −30 | −25 | −25 | −20 |
| Evaporation weight loss (ASTM 2595) | | | | | | | |
| 120° C., 22 hr (%) | 14 | 6 | — | — | — | — | — |
| 149° C., 22 hr (%) | — | 20 | 2 | 0.7 | 0.5 | 0.3 | — |
| 204° C., 22 hr (%) | — | — | 15 | 1.7 | 1.2 | 0.9 | 0.5 |

TABLE 3

| | Fomblin Z Lubricant Grades | | | |
|---|---|---|---|---|
| Typical Properties | Z03 | Z15 | Z25 | Z60 |
| Approximate ISO grade | 15 | 100 | 150 | 320 |
| Molecular weight (AMU) | 4000 | 8000 | 9,500 | 13,000 |
| Kinematic viscosity (ASTM D445) | | | | |
| 20° C. (cSt) | 30 | 160 | 263 | 600 |
| 40° C. (cSt) | 18 | 92 | 157 | 355 |
| 100° C. (cSt) | 5.6 | 28 | 49 | 98 |
| Viscosity index (ASTM D2270) | 317 | 334 | 358 | 360 |
| Pour point (° C.) (ASTM D97) | −90 | −80 | −75 | −63 |
| Evaporation weight loss (ASTM 2595) | | | | |
| 149° C., 22 hr (%) | 6.0 | 0.2 | — | — |
| 204° C., 22 hr (%) | n.a. | 1.2 | 0.4 | 0.2 |

TABLE 4

| | Fomblin M Lubricant Grades | | | |
|---|---|---|---|---|
| Typical Properties | M03 | M15 | M30 | M60 |
| Approximate ISO grade | 15 | 100 | 150 | 320 |
| Molecular weight (AMU) | 4000 | 8000 | 9,800 | 12,500 |
| Kinematic viscosity (ASTM D445) | | | | |
| 20° C. (cSt) | 30 | 150 | 280 | 550 |
| 40° C. (cSt) | 17 | 85 | 159 | 310 |
| 100° C. (cSt) | 5 | 22 | 45 | 86 |
| Viscosity index (ASTM D2270) | 253 | 286 | 338 | 343 |
| Pour point (° C.) (ASTM D97) | −85 | −75 | −65 | −60 |
| Evaporation weight loss (ASTM 2595) | | | | |
| 149° C., 22 hr (%) | 6.5 | 0.8 | — | — |
| 204° C., 22 hr (%) | — | 3.0 | 0.7 | 0.4 |

PFPE of the invention may also include functionalized PFPE, wherein $R^1$ and $R^2$ in formulas I–IV are other than halogen, perfluoroalkoxy, and perfluoroalkyl. Such functional groups include, without limitation, alkyl amide, silane, phosphate, phosphate esters, carboxyl, carboxyl esters, and hydroxyl.

If used, the functionalized PFPE should be limited to an amount that does not adversely affect the antifoam property of the antifoam composition containing them. In a preferred embodiment, non-functional PFPE are used along with functionalized PFPE. With this in mind, functionalized PFPE may be chosen for use as antifoam agents.

In one embodiment, the end groups $R^1$ and $R^2$ are independently represented by $A^1$—$CF_2O$— and —$CF_2$—$A^2$, respectively. The groups $A^1$ and $A^2$ may be the same or different, and may be hydrogen, fluorine, or chlorine. In a preferred embodiment, at least one, and preferably both, of $A^1$ and $A^2$ comprise functional groups including carboxyl, amide, silane, hydroxyl, and phosphate. Non-limiting examples of $A^1$ and $A^2$ include —$CONHR_H$;
—Ak—OH;
—Ak—$Si(OR_H)_3$;
—$COOR_H$;
—$CH_2(OCH_2CH_2)_pOH$;
—$CH_2OCH_2CH(OH)CH_2OH$; and
—Ak—$OP(O)(OH)_2$ wherein $R_H$ is H or an alkyl group with 1 to 10 carbon atoms, Ak is a bond or an alkylene group with 1 to 10 carbon atoms, and p is from 1 to about 20.

In another embodiment, the PFPE are represented by a formula $Cl(CF_2CFCF_3O)_nCF_2$—B, wherein B is the same as $A^1$ or $A^2$ above.

Functionalized PFPE are well known in the art and are commercially available. For example, they are available under the Fluorolink® line from Ausimont and under the Krytox line of Dupont. Non-limiting examples of commercially available functionalized PFPE are given in Table 5.

TABLE 5

| Supplier | Tradename | Structure |
|---|---|---|
| Solvey/Ausimont | Fluorolink S10 | $(EtO)_3Si(CH_2)_3F_2CO(CF_2CF_2O)_m(CF_2O)_nCF_2(CH_2)_3Si(OEt)_3$<br>$m + n = 40–180; m/n = 0.5–2.0$ |
| Solvey/Ausimont | Fluorolink F10 | $(HO)_2POR_HF_2CO(CF_2CF_2O)_m(CF_2O)_nCF_2R_HOP(OH)_2$<br>with $=O$ on each P<br>$m + n = 40–180; m/n = 0.5–2.0$ |
| Solvey/Ausimont | Fluorolink D10H | $HOCH_2F_2CO(CF_2CF_2O)_m(CF_2O)_nCF_2CH_2OH$<br>$m + n = 40–180; m/n = 0.5–2.0$ |
| Solvey/Ausimont | Fluorolink T10 | $HOCH_2CHCH_2OCH_2F_2CO(CF_2CF_2O)_m(CF_2O)_nCF_2CH_2OCH_2CHCH_2OH$<br>with OH on each CH<br>$m + n = 40–180; m/n = 0.5–2.0$ |
| Dupont | Krytox Alchol TLF-8976 | $F(CFCF_2O)_nCFCH_2OH$<br>with $CF_3$ branches<br>$n = 10$ |
| Dupont | Krytox Phosphate KDP-4413 | $F(CF_2CF_2O)_nCFCH_2OP(OH)_2$<br>with $CF_3$ branches and $=O$ on P<br>$n = 10$ |

Silane functionality is illustrated by the —Si(OEt)$_3$ groups of Fluorolink S10. The PFPE may be monofunctional, difunctional, trifunctional, or tetrafunctional. For example, Krytox Alcohol TLF-8976 in Table 5 has a single hydroxyl functional group. Fluorolink D10H illustrates difunctional hydroxyl PFPE, while Fluorolink T10 is a non-limiting example of a tetrahydroxy functional PFPE. In further non-limiting examples, phosphate functional PFPE may be monofunctional or difunctional. These are illustrated by Krytox Phosphate KDP-4413 and Fluorolink F10, respectively, in the table.

Effective defoaming capability of the PFPE of the invention depends in part on its insolubility in the process medium in which it acts. In the functional fluid, the antifoam additive is dispersed as a second liquid phase. The second phase has a tendency to segregate itself to reside at liquid air interfaces, including bubbles, due to its limited solubility. Although the insoluble nature of the antifoam compounds leads to its antifoam performance, the insolubility imposes limitations on the maximum concentration that can be blended into a stable dispersion with suitable shelf life for commercial use. For example, the PFPE of the invention may be blended into automatic transmission fluid with high shear blending processes to mix in a limited concentration of antifoam agent. It is also possible to make supplemental additions, or "top treats" of the PFPE of the invention directly into the automatic transmission. In a preferred method, an antifoam compound is delivered into a functional fluid, such as an engine oil or automatic transmission fluid, by leaching into the fluid upon contact of fluid with a rubber composition containing the antifoam compound. However the PFPE is added, it is preferred to use a PFPE having a viscosity in the range of about 1–150,000 centistokes to allow for blending into the fluid, either at the formulator's facility with high shear blending equipment, or in the sump of an engine or automatic transmission system.

The rubber compositions of the invention contain the antifoam compound or compounds in addition to conventional elastomers and other compounds. Compounded rubbers and methods for their preparation are well known. See for example the general discussion given in Chapter 2 of *Rubber Technology*, Third Edition, edited by Maurice Morton (Van Nostrand Reinhold Company, 1987), the disclosure of which is herein incorporated by reference.

Conventional rubber composition additives include elastomers, processing aids, vulcanization agents, accelerators, accelerator activators, age resistors (antidegradants), fillers, softeners, and miscellaneous ingredients. The basic component of rubber compositions is elastomer. It may be provided in the form of rubber alone, or as masterbatches of rubber and oil, rubber and carbon black, rubber-oil-carbon black, and the like. Combinations or blends of elastomers may be used, so that the rubber composition contains one or more elastomers. The elastomers are selected in order to obtain the specific physical properties desired in the final product.

A wide variety of natural and synthetic rubbers is available for use as the elastomers in the rubber compositions of the invention. Natural rubber consists essentially of cis-1, 4-polyisoprene, and is available from a variety of natural sources. Synthetic rubbers include synthetic polyisoprene and a number of other rubber materials that have been developed over the years. Non-limiting examples of synthetic rubbers include acrylic elastomers, acrylonitrile butadiene elastomer (NBR), butyl rubber (IRR), isobutylene-isoprene elastomer, chlorinated polyethylene elastomer (CM, CPE), chlorosulfonated polyethylene (CSM), epichlorohydrin elastomer, ethylene-propylene copolymer (EPM), ethylene-propylene-diene terpolymer (EPDM), ethylene/butene elastomer, ethylene/octane elastomer, ethylene/vinylacetate copolymer, isobutylene-paramethylstyrene elastomer (IMS), polybutadiene elastomer (BR), polychloroprene (CR), polyisobutylene, polyisoprene (IR), polynorbornene (PNR), and styrene-butadiene rubber (SBR). For high temperature applications, such as for use in automatic transmissions fluids, acrylic elastomers (ACM) and the ethylene acrylic elastomers are particular suitable.

Acrylic elastomers (ACM) are copolymers based on a backbone containing repeating units of acrylic monomers (about 95–99%) and a so-called reactive cure site monomer (about 1–5%). Crosslinking or "vulcanization" is dependent on the reactivity of the cure site monomer. Acrylic monomers include alkyl esters such as ethyl acrylate and butyl acrylate, and alkoxy esters such as methoxy ethyl acrylate and ethoxy ethyl acrylate. The cure site monomer is usually proprietary to a particular supplier. In ACM resins, the cure site typically has a halogen—especially chlorine functionality, that allows for crosslinking reactions to occur. Acrylic elastomers are resistant to oils at elevated temperatures and to aliphatic hydrocarbons. As such, they are preferred as the elastomer component of rubber compositions in contact with oil based functional fluids such as automatic transmission fluids. Acrylic resins are commercially available, for example from Ethyl Corporation under the Hitemp tradename.

Ethylene acrylic elastomers are similar to acrylic elastomers, except the backbone is generally based on ethylene and acrylic ester monomers, with a cure site typically based on a carboxylic acid. In one embodiment, the acrylic ester is methyl acrylate, and the cure site monomer is a carboxylic acid functional monomer. They share the acrylic elastomer properties of resistance to oils and high temperatures. Ethylene acrylic elastomers or rubbers are commercially available, for example from DuPont under the Vamac® tradename.

The elastomers are the major component of most rubber compositions. In a typical recipe, the ingredients are normally given in amounts based on a total of 100 parts of the elastomers making up the rubber composition. The elastomers are listed as 100, with the levels of other additive being noted as parts per hundred parts rubber (phr).

Most rubber compositions must be crosslinked or vulcanized to develop suitable properties for their end use. To this end, vulcanization agents are included in rubber composition recipes. The vulcanization agents may be classified as sulfur or non-sulfur.

In one embodiment, the vulcanization agent contains elemental sulfur or other sulfur compound. Non-limiting examples of non-elemental sulfur compounds include tetramethylthiuram disulfide, dipentamethylenethiuram hexasulfide, dimorpholinyl disulfide, dibutylxanthogen disulfide, and alkylphenol disulfide.

Most non-sulfur vulcanization agents belong to one of three groups: 1) metal oxides; 2) difunctional compounds; and 3) peroxides. Metal oxides are particularly suitable for crosslinking carboxylated elastomers or chlorine containing elastomers such as polychloroprene and chlorosulfonated polyethylene. Non-limiting examples of useful metal oxide vulcanization agents include zinc oxide, letharge (PbO), blends of letharge and magnesia (MgO) and combinations of magnesia and pentaerythritol.

Difunctional compounds act as vulcanizing agents by reacting with functional groups to form crosslinks. For example, epoxy resins may be used with nitrile rubbers, phenolic resins or quinonedioximes may be used with butyl rubber, and diamines or dithio compounds with fluororubbers.

Organic peroxides may be used to crosslink rubbers that contain no double bonds or that do not contain other reactive groups capable of forming crosslinks with a difunctional compound. Non-limiting examples of peroxide vulcanization agents include dicumyl peroxide, 2,5-bis(t-butylperoxy)-2,5-dimethylhexane, and zinc peroxide.

Accelerators may be used in rubber recipes to accelerate the rate of cure and/or reduce the temperature at which cure occurs. Non-limiting examples of accelerators, listed from slow to fast, include aniline, diphenylguanidine, hexamethylene tetramine, mercaptobenzothiazole, benzothiazyl disulfide, thiurams, dithiocarbamataes, and xanthates. Accelerator activators may be used to activate the accelerator so it performs more effectively. Commonly used accelerator activators include, without limitation, an inorganic compound such as zinc oxide, lime, letharge, red lead, white lead, magnesium oxide, alkaline carbonates, and hydroxides. Organic acids may be used in combination with the metal oxides. Non-limiting organic acid examples include stearic, oleic, lauric, palmitic, and myristic acids, as well as hydrogenated palm, castor, fish, and linseed oils.

Age resistors or anti-degradants protect the rubber from degradation based on interaction with ultraviolet light or environmental oxidants. Age resistors include antioxidants and antiozonants. A wide variety of chemical compounds is available to protect the rubber compositions from degradation. Three main chemical families include secondary amines, phenolics, and phosphites.

Softeners are used as physical plasticizers to modify the physical characters of the rubber. One important class of softeners is the ester plasticizers. Non-limiting examples include dicapryl phthalate, butyl cuminate, dibutyl phthalate, butyl lactate, methyl ricinoleate, butyl oleate, dibutyl sebacate, dioctyl phthalate, methyl oleate, and tricresyl phosphate. Other softeners or plasticizers include fatty acids, vegetable oils, petroleum products, pine tar products and resins.

In addition to the classes of additives above, miscellaneous ingredients include abrasives, blowing agents, colorants, flame retarders, homogenizing agents, internal lubricants, odorants, and retarders. These may be incorporated into the rubber composition to provide specific physical or chemical properties.

Most rubber compositions also include fillers that color, reinforce, extend, and/or make cheaper the compositions. The two major classes of filler used are carbon blacks and non-black fillers. Non-black fillers include, without limitation, semi-reinforcing materials such as clays, extending fillers such as calcium carbonate, re-enforcing fillers such as precipitated silica, and pigmenting fillers such as titanium dioxide.

The most common methods for incorporating and compounding ingredients into rubber compositions involve the use either of a mill or an internal mixer such as a Banbury mixer. Mills and mixers for rubber compounding are commercially available. Typical laboratory recipe and mixing schedules have been developed by a number of industry groups, such as committee D11 on rubber and rubber like materials of the American Society for Testing and Materials (ASTM).

The rubber compositions of the invention may be used to deliver an antifoam compound to a functional fluid by placing the rubber composition containing the antifoam compound in contact with the fluid. Upon contact with the functional fluid, the rubber composition leaches the antifoam compound so that a certain quantity of the antifoam compound of the rubber composition is delivered into the fluid. The rate of leaching and the amount of antifoam compound leached depend on a number of factors, including the compatibility between the elastomer and the antifoam compound, the nature of the functional fluid, and the temperature of use. Sufficient amounts of the rubber compositions of the invention should be placed in contact with the functional fluid to deliver an effective antifoaming amount of the antifoam compound. In the case of automatic transmission fluids, it is preferred to deliver an amount of antifoam compound such that the total fluid contains by weight 5 ppm (0.0005%) to about 1% of the antifoam compound. Depending on the efficiency and rate of leaching, it may be desirable to provide rubber compositions in contact with the fluid that contain some multiple or excess of antifoam compound over that required to make up the antifoam effective level.

In one embodiment, the rubber compositions of the invention may be used as substitutes for rubber compositions that are already in the system to be treated with antifoam compound. For example, in the case of automatic transmissions, the rubber compositions of the invention may replace the gaskets, seals, O-rings or other rubber compositions that are used in the transmission. An advantage of this procedure would be that the rubber compositions of the invention could be utilized without redesign of the transmission or its packaging.

In another embodiment, the rubber compositions of the invention are used as coupons or other physical forms that are mounted or otherwise affixed somewhere in the fluid sump so that they remain in contact with the fluid during use. Thus, they may be mounted in brackets or other mounting niches provided in the system to be treated. In an automatic transmission, brackets or other mounting apparatus may be provided in the fluid sump defined by the housing of the transmission. In an engine, a rubber composition according to the invention may likewise be mounted or installed in the crank case, oil pan, or other location where it can contact the lubricating fluid. Conventional packaging considerations apply. Space for the coupon or other form, which can take any shape needed to fit inside the packaging environment, may be readily designed. In comparison to the embodiment where the rubber composition is used to replace an existing rubber composition in the system, the current embodiment will gnerally involve some effort and redesign to place the rubber composition in the sump.

The invention may also be practiced by contacting the rubber composition with the functional fluid for a time sufficient to leach an effective amount of antifoam compound into the functional fluid. The rubber composition may then be removed from contact with the functional fluid. In a preferred embodiment, the rubber composition is left in contact with the functional fluid during use.

Effective defoaming capability of the antifoam compounds of the invention depends in part on their insolubility in the process medium. The antifoam additive is dispersed as a second liquid phase. The second phase has a tendency to segregate itself to reside at liquid air interfaces, including bubbles, due to its limited solubility. Although the insoluble nature of the antifoam compounds leads to its antifoam performance, the insolubility imposes limitations on the maximum concentration that can be blended into a stable dispersion with suitable shelf life for commercial use. The antifoam compounds of the invention may be blended into automatic transmission fluid with high shear blending processes to mix in a limited concentration of antifoam agent. It is also possible to make supplemental additions, or "top treats" of the antifoam compounds of the invention directly into the automatic transmission. In a preferred method, an antifoam compound is delivered into a functional fluid, such as an automatic transmission fluid, by leaching into the fluid upon contact of transmission fluid with a rubber composition containing the antifoam compound. However antifoam is added, it is preferred to use an antifoam compound having a viscosity in the range of about 1–150,000 centistokes to allow for ready blending and dispersal into the functional fluid.

Treat levels of the antifoam compound of the invention should be as low as practical to avoid excessive costs, but should be at levels sufficient to reduce the foam in a functional fluid and/or the cavitation or pump whine noise associated with the foam in, for example, an automatic transmission. Generally, the antifoam should be delivered in such an amount that it will be present in a functional fluid at a level from about 5 ppm (0.0005%) to about 1% by weight. More preferably, the upper level of antifoam compound is about 0.5%, and more preferably the fluid contains up to 0.3% by weight of the antifoam compound. In a preferred embodiment, antifoam compound is delivered to an automatic transmission fluid at a level of 0.0005% to 0.269% by weight. To illustrate, in a continuously variable transmission having a sump volume of 8 liters, for example, 3 g of delivered antifoam compound results in a treat level of about 0.05% of the antifoam compound assuming the ATF has a density of ~0.8.

The treatment level of antifoam compound in functional fluids will be influenced by the presence of other performance additives in the fluid, especially as the other additives affect the amount of air entrainment in the fluid. Examples of such additives include pour point depressants, viscosity index improvers, antioxidants, corrosion inhibitors, extreme pressure agents, antiwear agents, and other antifoam agents.

A variety of functional fluids may be used in the practice of the inventions. For illustrative purposes and not by way of limitation, the invention will now be further described for use in ATF. Blended automatic transmission fluids containing the antifoam compositions of the invention must generally exhibit a flash point greater than about 170° C., withstand oxidation, suppress volatilization, and resist breakdown. Further, the blended ATF must exhibit non-foaming characteristics at high temperatures and pressures and low viscosity at low temperatures.

In addition to the base lubricating oil and the antifoam compounds, formulated ATF contain a number of other conventional additives such as:

boronated or non-boron dispersants;
anti-oxidation compounds;
seal swell compositions;
friction modifiers;
extreme pressures/antiwear agents;
viscosity modifiers;
poor point depressants; and
detergents.—

The automatic transmission fluid should meet or exceed the specifications of the car manufacturer. An example of a suitable ATF is GM DEX-CVT®, which is a continuously variable transmission fluid meeting both GM 10028N and GM 9986219 specifications.

The base oils used in forming the automatic transmission fluids of this invention can be any suitable natural or synthetic oil having the necessary viscosity properties. Thus, the base oil may be composed entirely of a natural oil such as mineral oil of suitable viscosity or it may be composed entirely of a synthetic oil such as a poly-alpha-olefin of suitable viscosity. Likewise, the base oil may be a blend of natural and synthetic base oils provided that the blend has the requisite properties for use in the formation of an automatic transmission fluid. Ordinarily, the base oil should have a kinematic viscosity in the range of 2 to 50 centistokes, preferably 3 to 8 centistokes (cSt), at 100° C. Preferred base oils are Group III stocks. A preferred base oil viscosity is, for example, 3.8 cSt for the ratio of VHVI 2 and VHVI 4 that is used. In an embodiment of the present invention, the individual viscosities of those base stocks are 2.8 cSt and 4.3 cSt, respectively.

ATF of the invention preferably contain detergent and dispersants. They function in part to solubilize fluid components and to suspend insoluble materials that build up over time during operation. In one embodiment, the detergent/dispersant contains a first component (such as an N-aliphatic alkyl substituted diethanolamine) and a second component comprising either an oil soluble phosphorus containing ashless dispersant and/or at least one oil-soluble boron-containing ashless dispersant. The ashless dispersants are present in amount such that the ratio of boron in the ashless dispersant is in the range of about 0.05 to about 0.2 part by weight of boron per part by weight of the first component, or the ratio of phosphorus in the ashless dispersant is about 0.1 to 0.4 parts per part by weight of the first component.

In one embodiment, the compositions of this invention contain at least one oil-soluble phosphorus- and boron-containing ashless dispersant present in an amount such that the ratio of phosphorus to the first component is in the range of about 0.15 to about 0.3 part by weight of phosphorus per part by weight of the first component, and such that the ratio of boron in the ashless dispersant is in the range of about 0.05 to about 0.15 part by weight of boron per part by weight of the first component.

Phosphorus- and/or boron-containing ashless dispersants can be formed by phosphorylating and/or boronating an ashless dispersant having basic nitrogen and/or at least one hydroxyl group in the molecule, such as a succinimide dispersant, succinic ester dispersant, succinic ester-amide dispersant, Mannich base dispersant, hydrocarbyl polyamine dispersant, or polymeric polyamine dispersant.

The ATF also contain antiwear agents in a level suitable for protecting the moving components (e.g. the pump and the gears of the transmission) from wear. Typically, the antiwear additives will be present at a level of about 0.025 to about 5% by weight of the ATF. A non-limiting example of a suitable antiwear agent is 2,5-dimercapto-1,3,4-thiadiazole (DMTD) or derivatives thereof. To illustrate, derivatives of DMTD include:

a) 2-hydrocarbyldithio-5-mercapto-1,3,4-thiadiazole or 2,5-bis-(hydrocarbyldithio)-1,3,4-thiadiazole and mixtures thereof;
b) carboxylic esters of DMTD;
c) condensation products of halogenated aliphatic monocarboxylic acids with DMTD;
d) reaction products of unsaturated cyclic hydrocarbons and unsaturated ketones with DMTD;
e) reaction products of an aldehyde and diaryl amine with DMTD;
f) amine salts of DMTD;
g) dithiocarbamate derivatives of DMTD;
h) reaction products of an aldehyde and an alcohol or aromatic hydroxy compound and DMTD;
i) reaction products of an aldehyde, a mercaptan and DMTD;
j) 2-hydrocarbylthio-5-mercapto-1,3,4-thiadiazole; and
k) products from combining an oil soluble dispersant with DMTD; and mixtures thereof.

Compositions a)–k) are described, for example, in U.S. Pat. No. 4,612,129 and patent references cited therein, the disclosures of which are incorporated by reference. Thiadiazoles are commercially available, for example, from the Ethyl Corporation as HiTEC® 4313.

Depending on the base stocks that are chosen, an amount of seal swell agent may be required to meet the OEM seal compatibility requirements. Use of Group II, Group III and Group IV base oils many times requires the addition of a material to swell seals. These materials may be chosen from the general categories of oil soluble diesters, aromatic base oils, and sulfones. Alkyl adipates are examples of soluble diesters that can be used. In a preferred embodiment, alkyl adipate is used at a treat rate of 3 to 20%, more preferably 3 to 10%, and most preferably about 5%.

A viscosity index (VI) improver is useful in the formulations and methods of the present invention and can include, but is not limited to, one or more materials selected from polyacrylate, polymethacrylate, styrene/olefin copolymer, styrene diene copolymer, EP copolymer or terpolymers, and combinations thereof. A preferred VI improver is a highly shear stable polymethacrylate polymer or copolymer used at, for example, about 15 percent by weight in the fluid formulation. VI improvers are commercially available.

The automatic transmission fluids of the invention may be used as lubricating compositions and hydraulic fluids in a variety of automotive transmissions. In one embodiment, the transmission has a sump volume of 13 liters (L) or less. In a preferred embodiment, the transmissions are continuously variable transmissions (CVT) with a sump of 9 L or less, preferably 8 L or less. One advantage of the ATF of the invention is that they reduce foam or entrained air in an ATF. This has the effect of reducing or eliminating the pump whine caused by the implosion of air bubbles on the pressure side of the pump. Because of the high pressures involved, the problem is most pronounced in automatic transmissions in general, and in CVT in particular. For this reason, in a preferred embodiment, the ATF of the invention are used as hydraulic and lubricating fluids in continuously variable transmissions. The CVT may be configured as transmissions for rear wheel drive cars or as transaxles for front wheel drive cars.

The invention has been described above with respect to some preferred embodiments. Further non-limiting description is given in the following Examples.

EXAMPLES

The levels for all components except the perfluoropolyether are given, as is conventional, as parts per hundred rubber (phr). The level of perfluoropolyether (antifoam compound) is given in % by weight of the entire rubber composition. The following components are used:

| | |
|---|---|
| ethylene/acrylic elastomer A | Vamac G (Dupont) |
| ethylene/acrylic elastomer B | Vamac GLS |
| acrylic elastomer A | Hitemp 4051 EP (Zeon) |
| acrylic elastomer B | Hitemp 4052 |
| acrylic elastomer C | Hitemp 4054 |
| antioxidant | Naugard 445 (Uniroyal) |
| activator/lubricant | Stearic Acid (CP Hall) |
| processing aid/dispersing agent | Vanfre VAM (Vanderbilt) - ethoxylated octadecyl alcohol, phosphate |
| surfactant | Armeen 18D (Akzo Chemical) |
| filler | Carbon black |
| plasticizer A | TP-759 (Rohm and Haas) - di(butoxyethoxyethyl)adipate |
| plasticizer B | WB-222 (Struktol) |
| vulcanizer A | Diak #1 (Dupont) - |

-continued

| | |
|---|---|
| vulcanizer B | hexamethylenediamine carbamate Rhenogran Diuron 80 (Rhein Chemie) |
| vulcanizer C | Hytemp NS70 (Zeon) |
| accelerator | Perkacit DPG (Ferro Corp.)-N,N'-diphenylguanidine |
| perfluoropolyether | Fomblin W500 (Ausimont) or Krytox GPL 107 (Dupont) |

| Component | Example 1 | Example 2 | Example 3 | Example 4 | Example 5 |
|---|---|---|---|---|---|
| perfluoropolyether | 5–30% | 5–30% | 5–30% | 5–30% | 5–30% |
| ethylene/acrylic elastomer A | 0 | 100 | 0 | 0 | 0 |
| ethylene/acrylic elastomer B | 100 | 0 | 0 | 0 | 0 |
| acrylic elastomer A | 0 | 0 | 100 | 0 | 0 |
| acrylic elastomer B | 0 | 0 | 0 | 100 | 0 |
| acrylic elastomer C | 0 | 0 | 0 | 0 | 100 |
| antioxidant | 2 | 2 | 2 | 2 | 2 |
| activator/lubricant | 1.5 | 1.5 | 1 | 1 | 1 |
| processing aid/dispersion agent | 1 | 1 | 0 | 0 | 0 |
| surfactant | 0.5 | 0.5 | 0 | 0 | 0 |
| black | 60 | 60 | 65 | 80 | 80 |
| plasticizer A | 10 | 10 | 0 | 0 | 0 |
| plasticizer B | 0 | 0 | 2 | 2 | 2 |
| vulcanizer A | 1.5 | 1.5 | 0 | 0 | 0 |
| vulcanizer B | 0 | 0 | 6 | 6 | 6 |
| vulcanizer C | 0 | 0 | 2 | 2 | 2 |
| accelerator | 4 | 4 | 0 | 0 | 0 |

Rubber compositions according to the recipes given in Examples 1–5 are formulated into coupons. The coupons are installed into the sump of an automatic transmission. Automatic transmission fluid is added to the sump to contact the rubber composition. Over time, antifoam compound comprising the perfluoropolyether leaches into the transmission fluid to provide a treat level of from 5 ppm to 1% by weight of the antifoam compound, based on the total weight of the transmission fluid.

The invention claimed is:

1. A method for reducing noise during operation of an automobile automatic transmission, comprising
   contacting a rubber composition with a lubricating composition, wherein the rubber composition comprises an elastomer and a perfluoropolyether compound, to deliver a perfluoropolyether compound into the lubricating composition; and
   lubricating the transmission with the lubricating composition comprising the perfluoropolyether compound.

2. A method according to claim 1, wherein the elastomer comprises an acrylic elastomer or ethylene acrylic elastomer.

3. A method according to claim 1, wherein the perfluoropolyether compound comprises a plurality of —($C_aF_{2a}O$)— repeating units, wherein a is from 1 to 10.

4. A method according to claim 1, wherein the perfluoropolyether comprises repeating units of —($C_bF_{2b}O$)— and —($CF_2$—O)—, wherein b is 2 to 10.

5. A method according to claim 3, wherein the perfluoropolyether further comprises one or more functional groups selected from the group consisting of alkyl amide, silane, phosphate, carboxyl, ester, and hydroxyl.

6. A method according to claim 1, comprising delivering an amount of perfluoropolyether into the lubricating composition so that the lubricating composition comprises 0.0005% to 1% by weight of the perfluoropolyether compound.

7. A method according to claim 1, wherein the transmission is a continuously variable transmission.

8. A method of reducing foam in an engine oil during operation of the engine, comprising
   contacting a rubber composition with a lubricating composition, wherein the rubber composition comprises an elastomer and a perfluoropolyether compound, to deliver a perfluoropolyether compound into the lubricating composition; and
   lubricating the transmission with the lubricating composition comprising the perfluoropolyether compound.

9. A method according to claim 8, wherein the elastomer comprises an acrylic elastomer or ethylene acrylic elastomer.

10. A method according to claim 8, wherein the perfluoropolyether compound comprises a plurality of —($C_aF_{2a}O$)— repeating units, wherein a is from 1 to 10.

11. A method according to claim 8, wherein the perfluoropolyether comprises repeating units of —($C_bF_{2b}O$)— and —($CF_2$—O)—, wherein b is 2 to 10.

12. A method according to claim 10, wherein the perfluoropolyether further comprises one or more functional groups selected from the group consisting of alkyl amide, silane, phosphate, carboxyl, ester, and hydroxyl.

13. A method according to claim 8, comprising delivering an amount of perfluoropolyether into the lubricating composition so that the lubricating composition comprises 0.0005% to 1% by weight of the perfluoropolyether compound.

14. A method of treating an automatic transmission, the transmission comprising a housing defining a lubricant sump, wherein the sump contains a lubricating composition, the method comprising contacting the lubricating composition in the sump with a rubber composition, wherein the rubber composition comprises an elastomer and an antifoam composition, wherein the antifoam composition comprises a perfluoropolyether compound.

15. A method according to claim 14, wherein the elastomer comprises an acrylic elastomer or ethylene acrylic elastomer.

16. A method according to claim 14, wherein the perfluoropolyether compound comprises a plurality of —($C_aF_{2a}O$)— repeating units, wherein a is from 1 to 10.

17. A method according to claim 14, wherein the perfluoropolyether compound comprises repeating units of —($C_bF_{2b}O$)— and —($CF_2$—O)—, wherein b is 2 to 10.

18. A method according to claim 16, wherein the perfluoropolyether compound comprises one or more functional groups selected from the group consisting of alkyl amide, silane, phosphate, carboxyl, ester, and hydroxyl.

19. A method according to claim 14, comprising delivering an amount of antifoam composition to the lubricating fluid so that the lubricating fluid comprises 0.0005% to 1% by weight of the perfluoropolyether compound.

20. A method according to claim 14, wherein the transmission is a continuously variable transmission.

21. A method of treating an engine comprising a crankcase defining a lubricant sump, wherein the sump contains a lubricating composition, the method comprising contacting the lubricating composition in the sump with a rubber composition, wherein the rubber composition comprises an elastomer and an antifoam composition, wherein the antifoam composition comprises a perfluoropolyether compound.

22. A method according to claim 21, wherein the elastomer comprises an acrylic elastomer or ethylene acrylic elastomer.

23. A method according to claim 21, wherein the perfluoropolyether compound comprises a plurality of —($C_aF_{2a}O$)— repeating units, wherein a is from 1 to 10.

24. A method according to claim 21, comprising delivering an amount of antifoam composition to the lubricating fluid so that the lubricating fluid comprises 0.0005% to 1% by weight of the perfluoropolyether compound.

* * * * *